United States Patent

Yurgevich et al.

Patent Number: 5,112,099
Date of Patent: May 12, 1992

[54] PLATE TRAILER JOINTS

[75] Inventors: Howard J. Yurgevich, Monticello; Stanley J. Mavoczynski, Lafayette, both of Ind.

[73] Assignee: Rosby Corporation, Monon, Ind.

[21] Appl. No.: 771,744

[22] Filed: Oct. 4, 1991

Related U.S. Application Data

[62] Division of Ser. No. 664,668, Mar. 5, 1991, Pat. No. 5,066,066.

[51] Int. Cl.⁵ .............................................. B62D 33/04
[52] U.S. Cl. ..................................... 296/181; 296/191; 52/464
[58] Field of Search ............... 296/181, 191, 183, 196, 296/197, 29; 220/1.5, 692, 677, 652, 681; 52/464, 461, 459, 395, 467, 468, 470, 471

[56] References Cited

U.S. PATENT DOCUMENTS

| | | | |
|---|---|---|---|
| 3,103,379 | 9/1963 | Stone et al. | 296/181 |
| 3,126,224 | 3/1964 | Carter et al. | 296/181 |
| 3,393,920 | 7/1968 | Ehrlich | 296/181 |
| 4,455,803 | 6/1984 | Kornberger | 52/464 X |
| 4,455,807 | 6/1984 | Ehrlich | 52/464 X |
| 4,685,721 | 8/1987 | Banerjen | 296/191 X |
| 4,810,027 | 3/1989 | Ehrlich | 296/181 |
| 5,058,756 | 10/1991 | Green | 296/181 X |

Primary Examiner—Margaret A. Focarino
Assistant Examiner—Joseph D. Pape
Attorney, Agent, or Firm—Locke Reynolds

[57] ABSTRACT

Joining member for joining an adjacent pair of plates on a side of a cargo carrier are formed by a rectilinear strip having an inner surface including a pair of flanges positioned between two rows of aperatures straddling a channel of uniform depth. A sealing strip fixed in said channel having a width about equal to the distance between said pair of flanges, a length equal to the rectilinear strip length, and a thickness greater than the channel depth seals the line of adjacency between the pair of plates. Alternatively, an inner strip including openings alligned with said channel for receiving logistics fittings is employed where the plates are spaced apart to permit the channel defining flanges to project between the plates.

11 Claims, 2 Drawing Sheets

PLATE TRAILER JOINTS

CROSS-REFERENCE TO RELATED APPLICATION

This document is a divisional application of parent U.S. patent application Ser. No. 07/664,668 filed March 5, 1991, entitled "PLATE TRAILER JOINTS" now U.S. Pat. No. 5,066,066.

BACKGROUND OF THE INVENTION

The present invention generally relates to van-type semi-trailers and similar cargo vehicles and containers constructed of a plurality of rectangular panels composed of thin aluminum plate or composite materials as disclosed in U.S. Pat. Nos. 4,685,721, 4,810,027, 4,904,017 and 4,940,279. The invention particularly relates to joining members for such cargo carriers, the joining members being rectilinear strips intended to join two adjacent panels in side-by-side relationship so as to form at least a portion of the wall structure of such cargo carriers.

Cargo carriers of the type disclosed in the above-noted patents have employed particularly thin rectangular panels coupled by relatively flat joining members in such a way as to form a semi-trailer, cargo vehicle, container, or other cargo carrier having a high cubic capacity. The very minimum thickness of materials has been employed to construct the walls of such a cargo carrier so as to maximize the volume of the cargo carrier for a given width. In the construction of such cargo carriers, particular care has been required in the handling of the panel members in order to protect the edges of the panel members to insure the panels are smooth and flat. Any burr, bend, or crease has the propensity to allow moisture to creep between the panel member and the joining member joining the panel to an adjacent panel thereby permitting possible damage to the cargo carrier contents. The burr, bend or crease in the plate edge have the tendency to displace the joining member outward from the edge portions of the plate. The special care handling requirements imposed during the construction of such cargo carriers contributed directly to an increased manufacturing cost of such carriers.

Other special problems of plate type cargo carriers resulted when it became desirable to include logistics tracks on the sides of such cargo carriers. The attachment of logistics tracks directly to the flat Plates is effectively prohibited since such an attachment requires holes in the plates for fasteners, which can contribute to the invasion of weather. Such holes also produce unwanted stress risers which might contribute to untimely product failure.

SUMMARY OF THE INVENTION

To overcome these and other problems associated with existing styles of joining members, the present invention conceives of a joining member for joining adjacent pairs of plates on a plate trailer comprising a rectilinear strip having an outer surface and an inner surface with parallel edges joining the outer and inner surfaces. Two rows of apertures extend between the outer and inner surfaces, one row adjacent each of the edges for receiving appropriate fasteners for fastening the joining strip to the plates to be joined together. The inner surface of the strip includes a pair of flanges positioned between the two rows of apertures with a channel of uniform depth situated between the pair of flanges.

In the first embodiment of the invention, a sealing strip is fixed in the channel, the strip having a width about equal to the distance between the pair of flanges, a length about equal to the length of the rectilinear strip and a thickness greater than the channel depth. The flanges defining the channel are situated midway between the parallel edges of the linear strip and straddle the line of adjacency between the pair of plates joined by the joining member. The sealing strip is compressed within the channel by the two plates of either side of the line of adjacency to seal the junction of the two plates.

One feature of the first embodiment of the present invention is the presence of the sealing strip Provided in the channel and situated to straddle the seam or juncture between the adjacent plates thereby maintaining a sealed barrier despite any slight flexing of the juncture during travel or operation of the plate trailer. The presence of small creases, burrs, or other imperfections in the edges straddled by the channel will generally be insufficient to cut the moisture barrier provided by the sealing strip and will not generally provide any structure which would otherwise act to displace the joining strip outward from the plate sufficiently to permit moisture to be driven past the line of fasteners into the interior of the cargo carrier.

In a preferred embodiment, the plate includes outer channels provided between the parallel edge and the row of fastener receiving apertures so as to prevent moisture from being pressure driven passed the row of fasteners. A second inner lateral channel is also provided which allows moisture to travel vertically within the joining member away from the joined seam between the two adjacent plates joined by the joining member. A small undercut on the inner edge of the second inner lateral channel allows for small amount of conformity correction to the pair of flanges defining the central channel where certain large plate errors may exist.

In a second embodiment of the present invention, the adjacent plates forming the wall are spaced apart from each other and the pair of flanges project between the pair of adjacent flanges toward a second inner strip. The inner strip includes appropriate openings aligned with said channel for receiving the desired logistics fittings. In a preferred embodiment, both the outer strip and inner strip are positioned on the outer surface of the adjacent pair of plates with the inner strip having an off-set center portion projecting between the selected pair of plates. In this embodiment, the lateral edges of the outer strip project laterally beyond the inner rectilinear strip and include a sealing means joining the outer edges of the outer rectilinear strip to the outer surface of the adjacent plates.

In another preferred embodiment of the invention, the outer rectilinear strip and the inner rectilinear strip are positioned on opposite surfaces of the selected pair of spaced adjacent plates. In this preferred embodiment, lateral channel means are provided on each side of the pair of flanges coincident with the spaced edges of the adjacent plates and sealing means is received in the lateral channels engaging the spaced edges of the pair of adjacent plates.

A feature of both embodiments is the use of a pair of rectilinear joining strips which adjoin the spaced plates with the logistics track being positioned between the pair of adjacent spaced apart plates. Such a structure has the advantage of increased strength over the use of a single joining member, yet at the same time provides for easy attachment of the desired fasteners and fittings. Further, since the fasteners and fittings are to be received in a strip which is positioned at least in part between the adjacent plates, this feature has the further advantage of reducing any projection of the logistics fittings into the cargo area thereby maximizing the cubic content of the cargo carrier.

Additional features and advantages of the present invention will become apparent to those skilled in the art upon consideration of the following detailed description of the preferred embodiments exemplifying the best modes of carrying out the invention as presently perceived. The detailed description particularly refers to the accompanying drawings.

DESCRIPTION OF THE PREFERRED EMBODIMENTS

Figure 1:
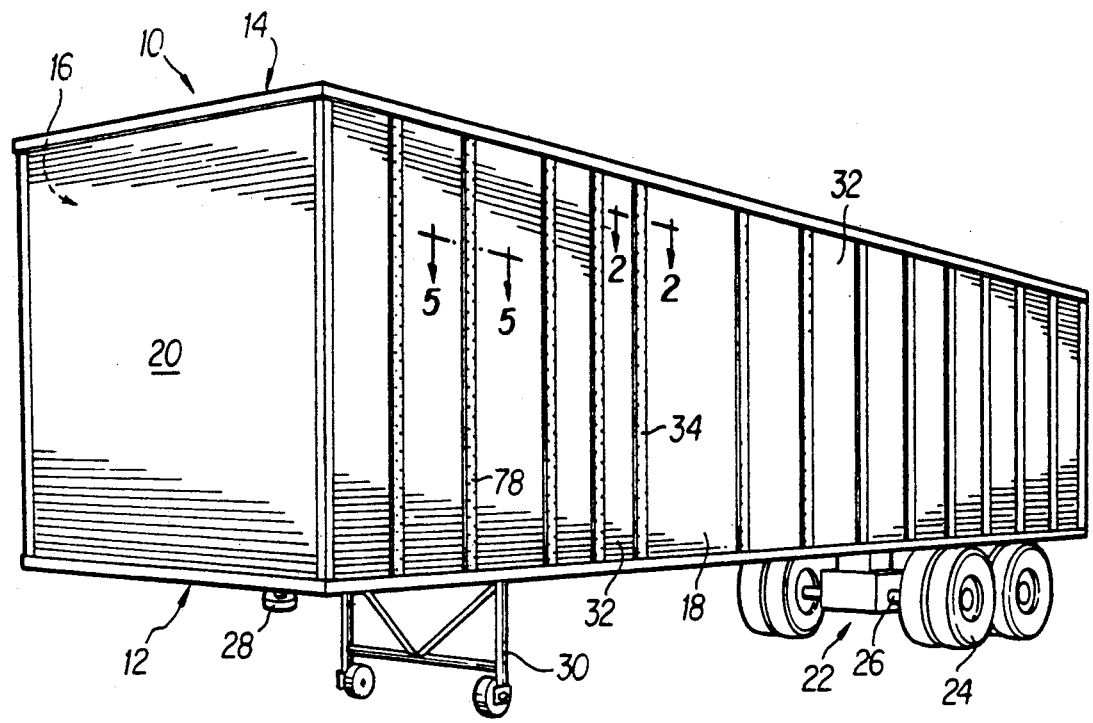
FIG. 1 is a perspective view of a plate trailer incorporating joining members in accordance with the present invention.

A plate trailer 10 in accordance with the present invention is shown in perspective in FIG. 1 to generally comprise a floor 12, a roof 14, and a pair of side walls 16 and 18. The trailer body also includes a forward bulkhead 20, a suspension 22 including wheels 24, and one or more axles 26 for supporting a rearward end of the trailer 10. The trailer 10 also includes a king pin 28 for attachment to the fifth wheel of a tractor in the conventional manner and a landing gear 30 for supporting the trailer 10 when not attached to a tractor. Each side wall 16 and 18 comprises a plurality of generally flat rectangular plates 32. The plates 32 may be constructed either of a lightweight metallic material, preferably tempered aluminum alloy, or may be a composite structure employing a thin aluminum skin bonded to each side of a polymeric core of polypropylene, polyethylene, or the like. The plates 32 are joined by joining members 34 which are in the form of vertically oriented rectilinear strips shown in greater detail in FIGS. 2 and 4.

Figure 2:
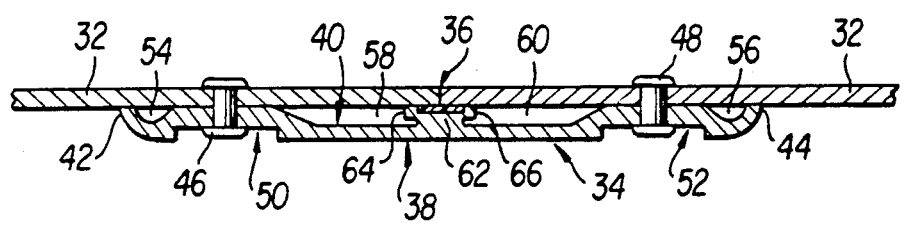
FIG. 2 is a sectional view taken along line 2—2 showing a joining member in accordance with the present invention in cross-section.

A shown in FIG. 2, the plates 32 are situated with respect to each other such that their edges define a common line of adjacency 36. The joining member 34 includes an outward facing surface 38 and an inward or plate facing surface 40. The outer surface 38 and inner surface 40 are joined by a pair of outside edges 42 and 44 defining the margins of the joining member. Two rows of fasteners 46 and 48 are provided in fastener receiving apertures in the joining member and extend through the plates 32 with one row of fasteners adjacent to each of the edges 42 and 44. The outer surface 38 includes linear depressions 50 and 52 intended to protect the heads of the fasteners 46 and 48 from any shearing action which might occur due to casual contact with an obstruction or the like.

The inside surface 40 of the joining member 34 includes outside channels 54 and 56 running the length of the strip which aid in trapping any moisture which might be pushed passed the margins 42 and 44 prior to contact with the row of fasteners 46 and 48, respectively. The outside channels 54 and 56 provide a vertical pathway for such moisture to be directed to the bottom of the trailer and thereby prevent any migration to the inside of the trailer 10.

Figure 3:
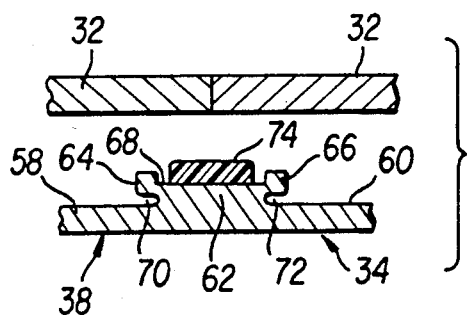
FIG. 3 is a detail sectional view of the joining member shown in FIG. 2 prior to assembly.

Between the two rows of fasteners 46 and 48 are a pair of lateral channels 58 and 60 which are separated by a stem member 62 supporting a pair of flanges 64 and 66 straddling the line of adjacency 36 between the two Plates 32. As shown in greater detail in FIGS. 3 and 4, the flanges 64 and 66 are separated by a central plate-facing channel 68 of uniform depth. Each of the lateral channels 58 and 60 include undercut portions 70 and 72, respectively, which define the inside edges of the lateral channels 58 and 60 and act together to define the width of the stem Portion 62 which is illustrated to have a width less than, but about equal to the distance between the flanges 64 and 66.

A sealing strip 74 of elastomeric material is situated in the channel 68. The sealing strip 74 has a width about equal to the distance between the flanges 64 and 66, a length equal to the length of the rectilinear strip 34 and a thickness considerably greater than the depth of channel 68.

Figure 4:
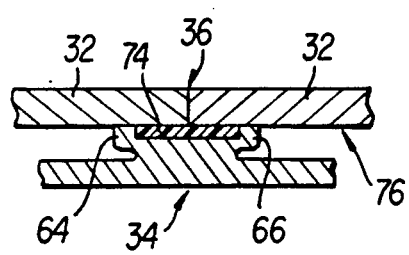
FIG. 4 is a detail sectional view of the joining member shown in FIG. 2 subsequent to assembly.

As the strip 34 is assembled to the plates 32 such that flanges 64 and 66 straddle the line of adjacency 36 between the plates 32 as shown in FIG. 4, the sealing strip 74 is compressed by contact with the outer surface 76 of the plates 32 in the immediate vicinity of the line of adjacency 36. Any minor misalignment of the plates 32 along the line of adjacency 36 is easily compensated for by the sealing strip 74. The presence of any burrs, bumps or creases in either of the plates 32 immediately adjacent to the line of adjacency 36 is also easily compensated for by the strip of sealing material 74 retained in compression on both sides of the line of adjacency 36 by the flanges 64 and 66 defining the sides of channel 68. An additional strip of sealing material (not shown) is preferably situated between the joining member 34 and the plates 32 along the two rows of fasteners 46 and 48 to prevent any moisture intrusion through the fastener receiving apertures in the plates 32.

While such a self-sealing joining member can be employed in most locations along the length of a trailer, it has been found that in certain locations it is desirable to provide a joining member which includes means for receiving logistics fasteners and fittings on an inner surface thereof. Two alternative embodiments of such a strip 78 are shown in section in FIGS. 5 and 6.

Figure 5:
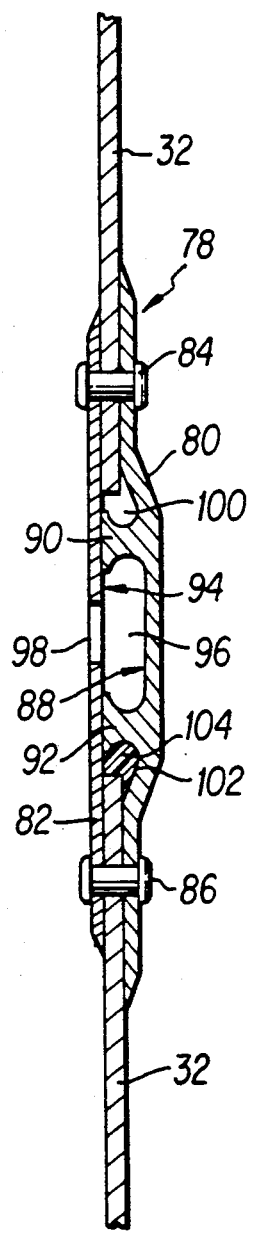
FIG. 5 is a sectional view taken along line 5—5 of FIG. 1 showing a second embodiment for joining member in accordance with the present invention.

In a first embodiment shown in FIG. 5, the joining member 78 includes an outer rectilinear strip 80 fixed to the outer surface of plates 32 and an inner rectilinear strip 82 fixed to the inner surface of the plates 32 by a common set of fasteners 84 and 86 which pass through both outer and inner rectilinear strips 80 and 82 as well as the plates 32. It is important to note that the plates 32 are spaced apart from each other. The inner surface 88 of the outer rectilinear strip 80 includes a pair of flanges 90 and 92 which project between the margins of the plates 32 to contact surface 94 of inner strip 82. A channel 96 of uniform depth is provided between the two flanges 90 and 92. The channel 96 is aligned with a plurality of openings 98 in the inner rectilinear strip 82 which were adapted to receive various logistics fittings. The outer margin of each of the flanges 90 and 92 defines a lateral channel 100 and 102 into which a sealing material 104 can be placed which engages the spaced edges of the plates 32 thereby sealing the channel against any intrusion by moisture. An additional strip of sealing material (not shown) is preferably situated between the joining member 78 and the plates 32 along the two rows of fasteners 84 and 86 to prevent any moisture intrusion through the fastener receiving apertures in the plates 32.

Figure 6:
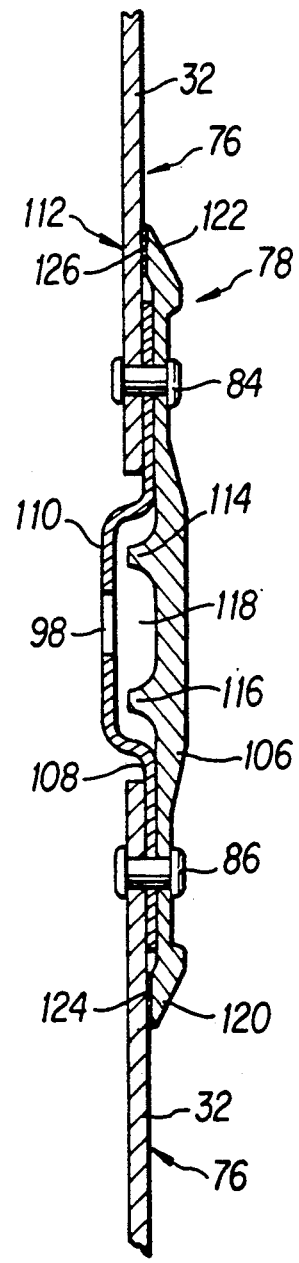
FIG. 6 is a sectional view similar to that of FIG. 5 of yet another embodiment of a joining member in accordance with the present invention.

An alternative embodiment for a joining member incorporating a logistics fittings receiving openings is shown in FIG. 6 wherein an outer rectilinear strip 106 and an inner rectilinear strip 108 are both situated on the outer surface 76 of plates 32. The inner strip 108 includes an offset central portion 110 which projects inward beyond the inner wall surface 112 of the trailer. A pair of flanges 114 and 116 of the outer longitudinal strip 106 Project into the space between the adjacent plates 32, but stop short of the inner strip central portion 110. Like flanges 90 and 92, the flanges 114 and 116 straddle a central channel 118 of essentially uniform depth which is aligned with the logistics receiving openings 98 provided in the inner linear strip 108. As in FIG. 5, the outer linear strip 106 and inner linear strip 108 are fixed to the adjacent plates 32 by a common row of fasteners 84 and 86. The lateral edges 120 and 122 of the outer lateral strip extend laterally beyond the outer limits of the inner strip 108 and are sealed to the plate outer surface 76 by sealing strips 124 and 126, respectively, which inhibit moisture from traveling into the interior of the trailer. An additional strip of sealing material (not shown) is preferably situated between the inner strip 108 and the plates 32 along the two rows of fasteners 84 and 86 to prevent any moisture intrusion through the fastener receiving apertures in the plates 32.

Although the invention has been described in detail with reference to certain illustrated preferred embodiments, variations and modifications exist within the scope and spirit of the invention as described and as defined in the following claims.

What is claimed is:

1. A cargo carrier having sides comprising a plurality of adjacent plates with outer surfaces, at least a selected pair of the adjacent plates being spaced from each other by a specified amount, and a joining member for joining said selected pair of adjacent plates, the joining member comprising:

an outer rectilinear strip and an inner rectilinear strip, each strip having an outer surface, an inner surface, parallel edges joining the outer and inner surfaces, and two rows of aperatures extending between the outer and inner surfaces, one row adjacent each of the edges of said outer and inner strips for receiving means for fastening the strips to said plates, the outer strip inner surface including a pair of flanges positioned between said selected pair of adjacent plates and projecting toward the inner strip outer surface forming a channel of uniform depth situated between the pair of flanges, and the inner strip including means alligned with said channel for receiving logistics fittings.

2. A cargo carrier according to claim 1 wherein said outer rectilinear strip and said inner rectilinear strip are both positioned on an outer surface of said selected pair of adjacent plates and wherein said inner strip further comprises an offset central portion projecting between said selected pair of adjacent plates.

3. A cargo carrier according to claim 2 wherein said outer rectilinear strip parallel edges extend laterally beyond said inner rectilinear strip parallel edges and wherein said cargo carrier further comprises sealing means for joining said outer rectilinear strip parallel edges to said outer surface of said selected pair of adjacent plates.

4. A cargo carrier according to claim 1 wherein said outer rectilinear strip and said inner rectilinear strip are positioned on opposite surfaces of said selected pair of adjacent plates and wherein said pair of flanges contact said inner strip outer surface.

5. A cargo carrier according to claim 4 wherein said outer rectilinear strip inner surface further comprises lateral channel means for forming a lateral channel situated outside said pair of flanges and coincident with the spaced edges of said selected pair of adjacent plates, said outer rectilinear strip inner surface further comprising sealing means received in said lateral channel means for engaging said spaced apart edges of said selected pair of adjacent plates.

6. A cargo carrier according to claim 1 wherein said pair of flanges contacts said inner rectilinear strip.

7. A cargo carrier according to claim 1 wherein said pair of flanges is spaced apart from said inner rectilinear strip.

8. A cargo carrier according to claim 1 wherein said means for receiving logistics fittings comprises a plurality of openings centrally and linearly arranged along the length of said inner rectilinear strip.

9. A cargo carrier according to claim 1 wherein the plates forming the trailer sides, which are joined by the joining members, consist essentially of aluminum.

10. A joining member for joining a pair of adjacent plates on a side of a cargo carrier, each plate having outer surfaces, the joining member comprising:

an outer and inner rectilinear strip each having an outer surface, an inner surface and parallel edges joining the outer and inner surfaces;
   means for fastening said outer and said inner rectilinear strips to said plates;
   flange means attached to said inner surface of said outer strip and positioned between said pair of adjacent plates, said flange means for forming a channel of uniform depth wherein said flange means projects towards said outer surface of said inner strip; and
   means for receiving logistics fittings aligned with said channel.

11. The joining member of claim 10 further comprising lateral channel means situated outside said flange means for receiving a sealing means for sealingly engaging said pair of adjacent plates.

* * * * *

UNITED STATES PATENT AND TRADEMARK OFFICE
CERTIFICATE OF CORRECTION

PATENT NO. : 5,112,099

DATED : MAY 12, 1992

INVENTOR(S) : Howard J. Yurgevich and Stanley J. Navoczynski

It is certified that error appears in the above-identified patent and that said Letters Patent is hereby corrected as shown below:

On the title page at [75], please delete "Mavoczynski" and insert therefor -- Navoczynski --.

Signed and Sealed this

Third Day of August, 1993

Attest:

MICHAEL K. KIRK

*Attesting Officer*   Acting Commissioner of Patents and Trademarks